United States Patent
Fukaya et al.

(10) Patent No.: US 6,226,590 B1
(45) Date of Patent: May 1, 2001

(54) VEHICULAR NAVIGATION SYSTEM AND STORAGE MEDIUM

(75) Inventors: Takaharu Fukaya; Koji Inoue, both of Anjo (JP)

(73) Assignee: Aisin AW Co., Ltd. (JP)

(*) Notice: Subject to any disclaimer, the term of this patent is extended or adjusted under 35 U.S.C. 154(b) by 0 days.

(21) Appl. No.: 09/131,332

(22) Filed: Aug. 7, 1998

(30) Foreign Application Priority Data

Aug. 8, 1997 (JP) .................................................. 9-227265

(51) Int. Cl.$^7$ ................................................ G01C 21/00
(52) U.S. Cl. ........................................ 701/209; 701/210
(58) Field of Search ................................ 701/200, 201, 701/207, 208, 209, 210, 211, 213; 340/988, 990, 995; 342/357.06, 357.08, 357.13

(56) References Cited

U.S. PATENT DOCUMENTS

| | | | |
|---|---|---|---|
| 5,523,765 | * 6/1996 | Ichikawa | 342/451 |
| 5,587,911 | * 12/1996 | Asano et al. | 701/202 |
| 5,938,718 | * 8/1999 | Morimoto et al. | 701/201 |
| 6,067,499 | * 5/2000 | Yagyu et al. | 701/201 |
| 6,076,041 | * 6/2000 | Watanabe | 701/211 |

* cited by examiner

*Primary Examiner*—William A. Cuchlinski, Jr.
*Assistant Examiner*—Edward Pipala
(74) *Attorney, Agent, or Firm*—Lorusso & Loud

(57) ABSTRACT

A vehicular navigation system is described as including a present position detector for detecting the present position of a vehicle; an input device for inputting information necessary for computing a guidance route; an output device for outputting information for route guidance; an information storage unit containing stored road information including branch data and link data and other data necessary for providing the guidance; a route search section for searching for a guidance route on the basis of the information input by the input means; a route information storage unit for storing the guidance route information registered by the route search section; and guide control section for outputting guidance information for a next guide branch to the output means, on the basis of the guidance route and the present position detected by the present position detector. The guide control section acquires the information for the next guide intersection from the route information storage unit and acquires information for roads at the guide branch from the road information held by the information storage unit, and determines the guidance information for the next guide intersection on the basis of an identified admission road to the guide intersection and the link data of the road information.

8 Claims, 10 Drawing Sheets

FIG. 3A

ROAD ATTRIBUTION DATA

| | | |
|---|---|---|
| OVERPASS /UNDERGROUND DATA | OVERPASS | ○ |
| | ADJACENT TO OVERPASS | |
| | UNDERGROUND | |
| | ADJACENT TO UNDERGROUND | |
| NUMBER OF LANES | THREE LANES OR MORE | |
| | TWO LANES | ○ |
| | ONE LANES | |
| | NO CENTERLINE | |
| BRANCH DATA | YES OR NO | 0 |
| RAMP DATA | YES OR NO | 0 |
| ROTARY DATA | YES OR NO | 1 |

FIG. 3B

ROAD NAME DATA

| ROAD CLASSIFICATION | | CLASSIFICATION NUMBER |
|---|---|---|
| EXPRESS WAY | MAIN ROAD | 1 |
| | JUNCTION | 2 |
| EXPRESSWAY (INTERCITY) | MAIN ROAD | 3 |
| | JUNCTION | 4 |
| TOLL ROAD | MAIN ROAD | 5 |
| | JUNCTION | 6 |
| PUBLIC ROAD { | NATIONAL ROAD | 7 |
| | PREFECTURAL ROAD | 8 |
| | OTHERS | 9 |

FIG. 4A

CAUTION DATA

| RAILROAD CROSSING | ○ |
|---|---|
| TUNNEL ENTRANCE | |
| TUNNEL EXIT | |
| WIDTH REDUCING POINT | |
| NONE | |

FIG. 4B

TRAVEL GUIDANCE DATA

| TOWARD RIGHT | |
|---|---|
| TOWARD LEFT | |
| TOWARD CENTER | ○ |
| NONE | |

FIG. 5

INTERSECTION DATA

| | NUMBER (k) OF INTERSECTIONS |
|---|---|
| 1 | INTERSECTION NO. |
| | INTERSECTION NAME |
| | SIGNAL DATA |
| | PEDESTRIAN CROSSING DATA |
| | BRANCH FEATURING DATA |
| | ADMISSION ROAD DATA |
| | NON-ADMISSION ROAD DATA |
| | LANDMARK DATA |
| | ⋮ |
| k | INTERSECTION NO. |
| | ⋮ |
| | LANDMARK DATA |

FIG. 6

GUIDE PHRASE DATA

| PHRASE KIND | PHRASE CONTENT |
|---|---|
| A. DISTANCE PHRASE | 1  ABOUT 700M<br>2  ABOUT 300M<br>3  SOON<br>4  AHEAD<br>5  JUST AHEAD<br>... ... ... ... ... ... ... ... |
| B. DIRECTION PHRASE | 1  GO STRAIGHT<br>2  TURN TO THE RIGHT<br>3  TURN TO THE LEFT<br>4  SLIGHTLY RIGHTWARD<br>5  SLIGHTLY LEFTWARD<br>6  TURN RIGHTWARD<br>7  TURN LEFTWARD<br>8  FOLLOW THE ROAD<br>9  FOLLOW THE ROAD RIGHTWARD<br>10  FOLLOW THE ROAD LEFTWARD<br>11  FORK<br>12  TURN TO THE RIGHT SHARPLY<br>13  TURN TO THE LEFT SHARPLY<br>14  ENTRANCE<br>15  EXIT<br>... ... ... ... ... ... ... ... |
| C. FEATURE PHRASE | 1  NO-SIGNAL INTERSECTION<br>2  AT THE NEXT SIGNAL<br>3  AT THE SECOND SIGNAL<br>4  AT THE INTERSECTION THIS SIDE OF SIGNAL<br>5  AT THE INTERSECTION NEXT THE SIGNAL<br>6  AT THE NEXT GAS STATION<br>... ... ... ... ... ... ... ... |
| ⋮ | ⋮ |

FIG. 7A
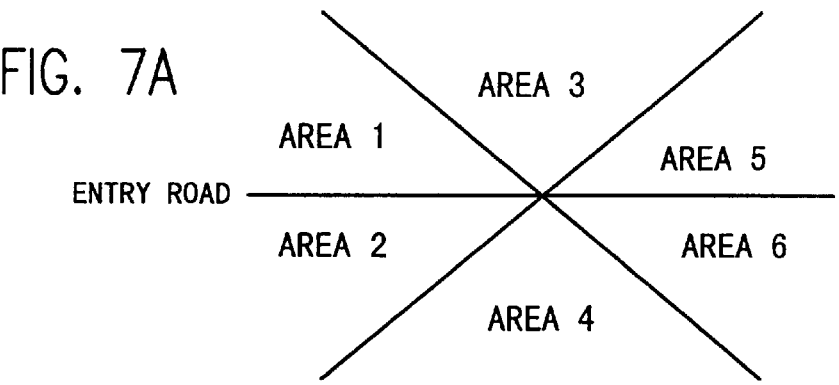
FIG. 7B
| AREA | DIRECTION GUIDE PHRASE |
|---|---|
| 1 | SHARP LEFT TURN |
| 2 | SHARP RIGHT TURN |
| 3 | LEFT TURN |
| 4 | RIGHT TURN |
| 5 | BEAR LEFT |
| 6 | BEAR RIGHT |
FIG. 8
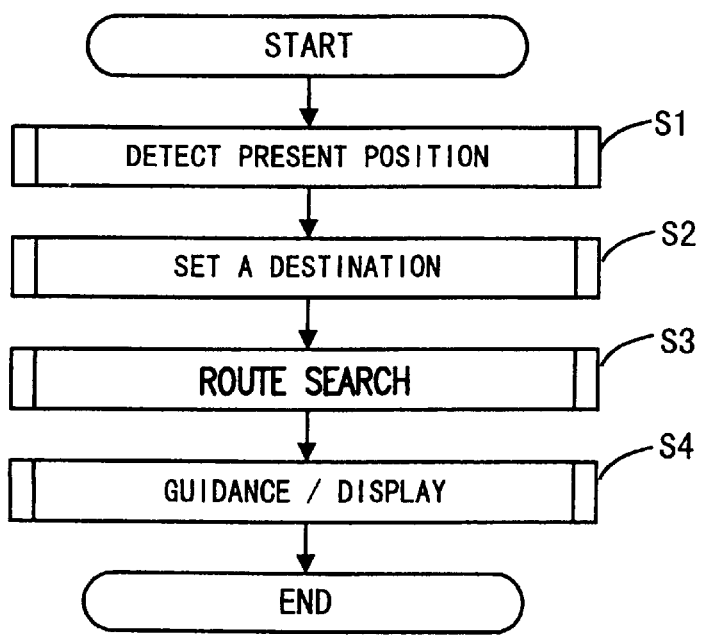

VEHICULAR NAVIGATION SYSTEM AND STORAGE MEDIUM

BACKGROUND OF THE INVENTION

1. Field of the Invention

The present invention relates to a vehicular navigation system providing voice guidance at a road branch point, and to a storage medium.

2. Related Art

In the prior art, there have been proposed a variety of route guidance systems for assisting travel through unfamiliar areas. The prior art route guide systems enable a guidance route to be followed to a destination identified by input. In such route guidance systems, direction guidance at a guide branch point requires acquiring information on a road entering the guide branch point and on a road departing the guide branch point.

In the prior art system, however, the directional information provided for the branch point on the guidance route is derived exclusively from the information acquired for the entering road and for the departing road. Thus, the guidance may not be understandable when the branch is complicated or when there are many roads linking at the intersection (branch point).

SUMMARY OF THE INVENTION

Accordingly, the invention has as its objective solution of the above described problems. In other words, an objective of the present invention is to provide a vehicular navigation system and a recording medium which provide understandable direction guidance for an intersection, even when the intersection is complicated or when there are many roads linking at the intersection.

In order to achieve the foregoing objectives, the present invention provides a vehicular navigation system including:

present position detecting means for determining the present position of a vehicle;

input means for inputting a destination and other information governing determination of a guidance route;

output means for outputting route guidance;

guidance information storage means containing stored road information including guide branch (e.g. intersection) data, link data and other data necessary for guidance;

route search means for determining the guidance route, designed for optimum travel in accordance with the information input through the input means, by search of the road information;

route information storing means for storing guidance route information for the determined guidance route; and guidance control means for outputting, through the output means, guidance for the next guide branch, in advance of the detected present position.

The guide control means acquires information relating to the next guide branch (e.g. intersection) from the route information storing means and acquires information on a road at the next guide branch from the road information stored in the guidance information storage means, and generates the guidance output for the next guide branch guide on the basis of information pertaining to an admission road to the guide branch, and link data for the guide branch included in the acquired road information.

According to the invention, in acquiring information for a guidance message pertaining to an intersection, a road having a link attribute is skipped. On the other hand, a road having no link attribute is registered as one departing the intersection.

The present invention may also be embodied in a storage medium having programs thereon for searching to determine a guidance route to a destination from a departure point or detected present location and for providing guidance along the guidance route. These stored programs provide for:

searching to locate a guide branch point on the guidance route;

acquiring information for all the roads meeting at the located guide branch point; and registering a road as one departing the guide branch point provided the road has no intersection link attribute.

According to the invention, moreover, the storage medium further comprises programs for skipping an intersection linking road on the condition that the road has the intersection link attribute, i.e. is a road segment internal to the intersection.

According to the invention, where an intersection is encountered which has intersection link roads, information on all the roads entering and departing the guide branch point can be acquired and understandable guidance provided, by skipping the intersection link roads and by registering the roads having no intersection link attribute as the departing roads.

BRIEF DESCRIPTION OF THE DRAWINGS

FIGS. 3A and 3B are data files showing an example of the structure of additional essential data files according to the invention;

FIGS. 4A and 4B are data files showing an example of the structure of more essential data files according to the invention;

FIG. 5 is a table showing an example of an intersection data file;

FIG. 6 is a table of guidance phrases;

FIGS. 7A is a diagram illustrating road departing areas for a guide intersection and FIG. 7B is a table of direction guide phrases correlated with the areas of FIG. 7A;

FIG. 8 is a flow chart of a main routine for operation of the system;

DESCRIPTION OF PREFERRED EMBODIMENTS

Figure 1:
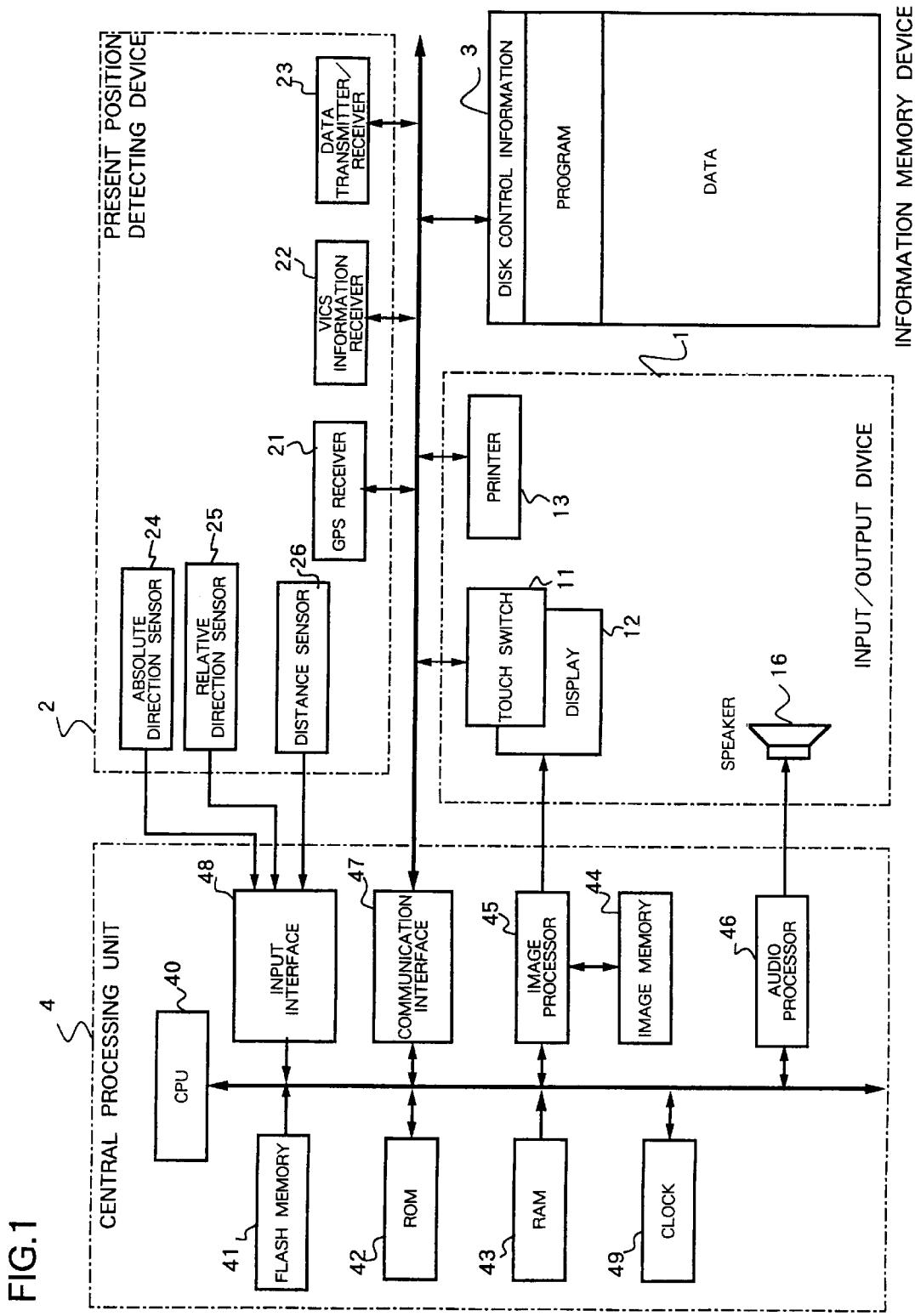
FIG. 1 is a block diagram of one embodiment of a navigation system according to the present invention.

FIG. 1 is a block diagram showing one embodiment of a navigation system according to the invention. In this embodiment, as shown in FIG. 1, the navigation system includes: an input/output unit 1 for inputting/outputting information pertaining to route guidance; a present position detecting unit 2 for detecting the present position of the vehicle; an information storage unit 3 containing navigation data for searching for a guidance route, display/voice guide data necessary for providing route guidance, programs (application and/or OS), and so on; and a central processing unit 4 for executing a route search, for generating the route guidance display and for controlling the entire system.

The input/output unit 1 functions to input a destination, to instruct the central processing unit 4 to execute the navigation processing according to the will of the driver, so as to output the guidance information, as needed by the driver, by voice and/or through a display screen, and to print the processed data. As the means for realizing these functions, the input portion includes a touch switch 11 or a control switch for inputting the destination as a telephone number or as map coordinates and for requesting route guidance. The input portion can optionally be a remote controller. On the other hand, the output portion includes: a display 12 for displaying the input data on the screen or the route guidance automatically on the screen, in response to a request of the driver; a printer 13 for printing the data processed by the central processing unit 4 or the data stored in the information storage unit 3; and a speaker 16 for outputting route guidance by voice.

A voice recognition unit may be added for enabling voice input or a recorded card reading unit for reading out data recorded on an IC card or a magnetic card. Likewise, a data communication unit may be added for exchanging data with a remote information source, such as an information center, which makes available data necessary for navigation via communication lines in response to a demand by the driver. Alternatively, the data communication unit may provide communication with a notebook type electronic unit stored in advance with data specific to the driver such as map data or destination data.

The display 12 is a color CRT or a color liquid crystal display for outputting in color all the screens that are necessary for the navigation, such as a route setting screen, a section map screen or an intersection map screen, based on the map data and guidance data processed by the central processing unit 4. The displayed screens include screens displaying buttons on the main screen for setting the route guidance, for the route being guided, and for switching the screens. Information on an approaching intersection on the guidance route, such as the name of the intersection, is popped up at an appropriate time, in colors, on the display.

The display 12 is mounted in the instrument panel near the driver's seat so that the driver is able to confirm the present position of the vehicle by looking at a section map screen and to obtain guidance information for the guidance route to be followed. The display 12 is equipped with touch switch 11, corresponding to the display of the function buttons, so that the aforementioned operations can be executed responsive to signals generated by touching the buttons. The input signal generating means, composed of the buttons and the touch switch, constitute the input portion of the input/output unit 1.

The present position detecting means 2 includes: a GPS receiver 21 for acquiring information by making use of the global positioning system (GPS); a VICS information receiver 22 for acquiring information by making use of FM multiplex broadcasting, an electromagnetic wave beacon or an optical beacon; a data transmitter/receiver 23 for communicating information interactively with a remote information center (such as an ATIS) or with another vehicle by making use of a portable telephone or a personal computer; an absolute azimuth sensor 24 for detecting the forward azimuth of the vehicle as an absolute azimuth, for example, by making use of the earth's magnetism; a relative azimuth sensor 25 for detecting the forward azimuth of the vehicle as a relative azimuth by making use, for example, of a steering sensor or gyro sensor; and a distance sensor 26 for detecting the distance covered by the vehicle from the number of revolutions of the wheels. The present position detecting means 2 is a device for transmitting/receiving the information on the travel of the vehicle, such as road information and traffic information, for detecting the present position of the vehicle, and for transmitting/receiving information pertaining to the present position.

The information storage unit 3 is an external storage unit containing stored programs and data for the navigational guidance and may be, for example, a CD-ROM. The stored programs will typically include a program for the route search, programs as illustrated by the flow charts of the drawings here, and programs for display output control necessary for route guidance and for voice output control necessary for voice guidance. The unit 3 will also contain the data necessary for execution of those programs, and the display information data necessary for the route guidance and the map displays. The stored data is organized as files of map data, search data, guide data, voice guide phrase data, map matching data, destination data, registered point data, road data, genre data, landmark data and so on, and includes all the data necessary for operation of the navigation system. The invention can be an embodiment of the type in which the data is stored exclusively in the CD-ROM whereas the programs are stored in the central processing unit.

The central processing unit 4 is composed of: a CPU 40 for executing a variety of operations; a flash memory 41 for retrieving the programs from the CD-ROM of the information storage unit 3 and storing them; a ROM 42 stored with programs (or program reading means) for checking and updating the programs of the flash memory 41; a RAM 43 for storing the information for the guidance route, such as the point coordinates and/or the names of the roads forming the guidance route, code No. of a set destination, or the data being processed; an image memory 44 stored with the image data to be used in generating a display on the display screen; an image processor 45 for retrieving the image data from the image memory 44 on the basis of a display output control signal from the CPU 40 and for graphically processing the image data and outputting a display; a voice processor 46 for synthesizing a voice message, phrase, or sentence, a sound and so on, as read out from the information storage unit 3, responsive to a voice output control signal from the CPU, as analog signals and for outputting the analog signals to the speaker 16; a communication interface 47 for transferring the input/output data by communication and a sensor input interface 48 for receiving the sensor signals from the present position detecting unit 2; and a clock 49 for entering the date and time into the internal diagnostic information. Here, while the route guidance has been described as including both a screen display and voice output, voice output can be selected as an option by the driver.

The programs for the aforementioned updating operations may be stored in the external storage unit.

The programs according to the invention and the other programs for executing the navigational guidance may be wholly stored in the CD-ROM or the external storage medium or partially or wholly stored in the ROM 42.

The data or programs, as stored in the external storage medium, are input as external signals which are received by and operated upon by the central processing unit of the navigation system to realize the various functions of the navigational system.

The navigation system according to the invention is in the form of a package including: the flash memory 41 of a relatively large capacity for reading the programs from the CD-ROM of the external storage unit, as previously described; and the ROM 42 of relatively smaller capacity containing the programs (or program reading means) for starting the CD. The flash memory 41 retains the stored information even if the power is disconnected and, thus, the flash memory 41 is a nonvolatile storage means. For starting the CD, moreover, the programs of the ROM 42 acting as the program reading means are started to check the programs stored in the flash memory 41 and to read the disk management information or the like of the CD-ROM of the information storing unit 3. The programs are loaded (or updated) by making decisions based on the retrieved disk management information and the state of the flash memory 41.

Figure 2:
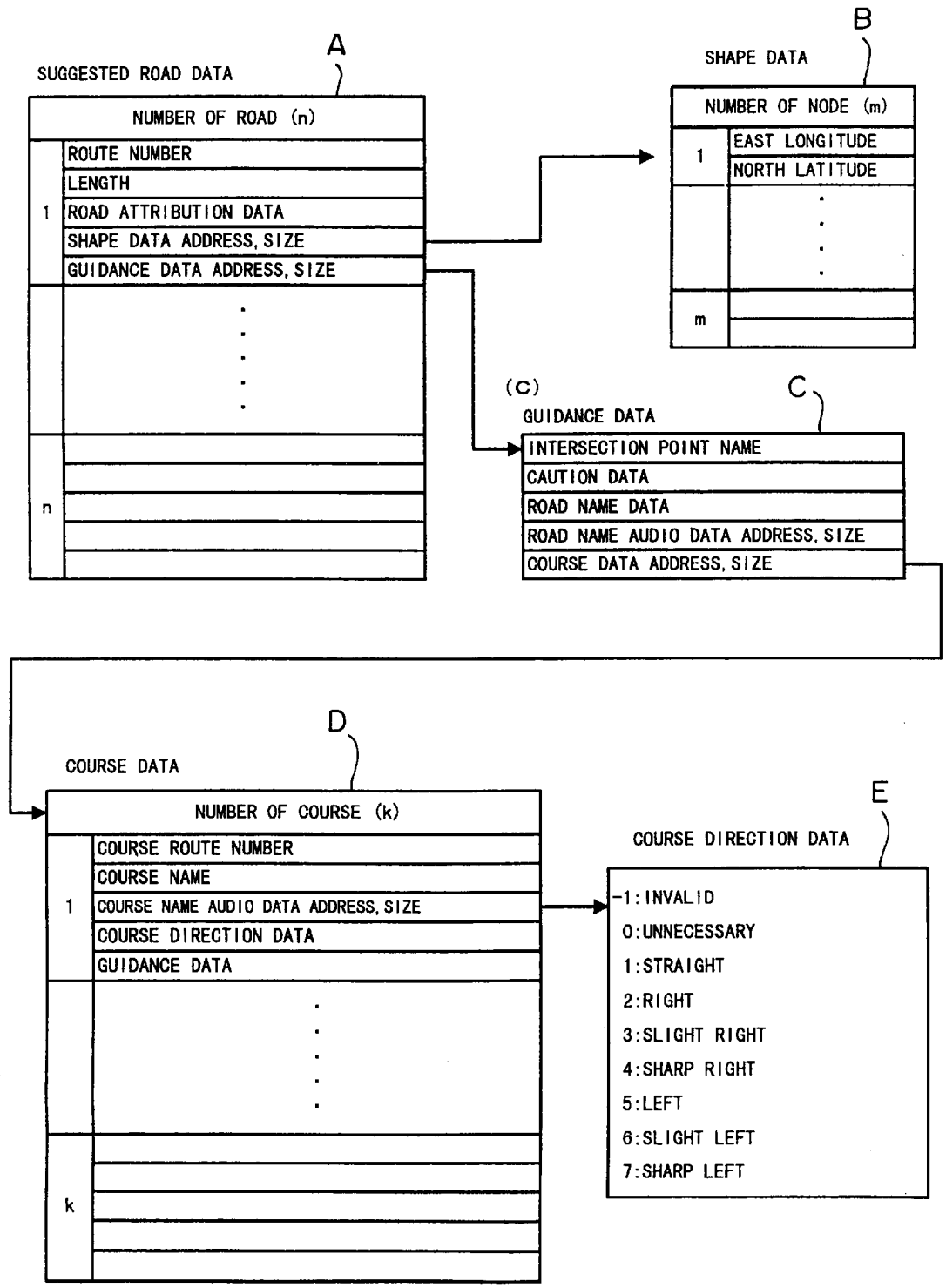
FIG. 2 is an illustration of data files showing examples of the structure of data essential to the invention.

FIGS. 2 to 4 show examples of the essential data files stored in the information storage unit 3 according to the invention, as shown in FIG. 1. In FIG. 2 a road data file A contains the data necessary for determination of the guidance by the route search means and for route guidance. For each of the n number of roads the road data file contains, individually correlated therewith, a road number, a length, road attribute data, the address and size of shape data, and the address and size of the guide data. A road number is assigned to each road segment between branch points and in each direction (to and from the destination). The road attribute data is exemplified in FIG. 3A, by information as to whether or not the road is an overpass, an access road for an overpass, an underground road or an access road for of the underground road, and by information on the number of lanes, branch data (or a flag indicating presence or absence of an intersection), ramp data (or a flag indicating presence or absence of a ramp) and rotary or link data (or a flag indicating presence or absence of an intersection link). The shape data are exemplified in B of FIG. 2 by coordinate data composed of longitude and latitude coordinates for each of m nodes of road number n divided by the nodes.

The guide data is exemplified in C of FIG. 2 by the name of an intersection (or a branch point), caution data, road name data, the address and size of road name voice data, and the address and size of course data. The caution data is exemplified, as shown in FIG. 4A, by the information indicating the presence or absence of a railroad crossing, a tunnel entrance or exit, a narrowing of the road or lack of a feature requiring caution, and are data for cautioning the driver of potential hazards other than intersections. The road name data is exemplified in FIG. 3B by the information as to the type of road, such as an expressway, a city expressway, a toll road, an ordinary road (e.g., national, state or other roads), and the information indicating whether the road such as, the expressway or toll road is a main road or a joining road, and is composed of road type data and numbers of the individual type data for each road type.

The course data is exemplified in D of FIG. 2, by the course road No., the course name, the address and size of the course name course direction data, and the travel guide data. The course direction data is exemplified in E of FIG. 2 by the information items "invalid" (no direction data is given), "unnecessary" (requiring no guidance), "straight", "right", "slight right", "sharp right", "left", "slight left", and "sharp left". The travel guidance data is exemplified in FIG. 4B by data identifying which of a plurality of lanes is to be followed, i.e. a lane closer to the right, closer to the left, closer to the center or no preference.

Here, the data structure of FIG. 2 is stored with the information on intersections in the road data, but the intersection data may be stored separate from the road data, as shown in FIG. 5. Further, the data of FIG. 2 may be stored with information indicating the presence of a signal, a pedestrian crossing, intersection features, roads entering a intersection, roads leaving the intersection, and/or landmark data. If road junction data is added to the road data, however, indication of no admission from one road to another may serve to reduce the amount of stored data.

FIG. 6 illustrates guide phrase data for voice guidance. A guide sentence is typically divided into a distance phase, a direction phrase and a feature phrase. When voice guidance is to be output, the individual phrases are combined to form a message such as "turn right soon", and the message is output in advance of a set guide branch point. In the invention, the road information is acquired for all the roads entering and departing the guide branch, e.g. intersection, as will now be described. In the direction phrase classification, there are stored in advance data for phrases such as "straight", "slight right (or left) turn", "bear right", "bear left", "keep right", "keep left", "fork", "sharp right turn", and "sharp left turn". These phrases are suitably selected for each individual guide branch.

FIGS. 7A and 7B serve to explain correlation between an area classification at an intersection and the direction guide phrases. In FIG. 7A, the area surrounding a guide branch is divided into areas 1 to 6 by angles from a road entering the guide branch. The areas 1 and 2 are sharp turn areas; the areas 3 and 4 are regular turn areas; and the areas 5 and 6 correspond to the bear left and bear right or slight turn areas. These areas 1 to 6, are correlated with individual direction guide phrases as shown in the table of FIG. 7B, which table is stored in the information storing unit.

A main routine for operation of the vehicular navigation system according to the invention is shown in FIG. 8. Referring to FIG. 8, when execution of the programs of the route guidance system are started by the CPU 51 of the central processing unit 4, the present position is detected by the present position detecting unit 2 and a map ("peripheral map") of the vicinity around the present position and the name and so on of the present position are displayed (at Step S1). Next, the destination is set (at Step S2) by input of a target name such as the name of a place or facility, or by input of a telephone number, a street address, a registered (prestored) point and so on to enable a search for a route from the present position to the destination (at Step S3). When the route is determined, the route guidance/display are repeated (at Step S4) until the destination is reached, while tracking the present position utilizing the present position detecting unit 2. When a detour setting is input before the destination is reached, a search area is set for a re-search, and new route guidance is output until the destination is reached.

Figure 9:
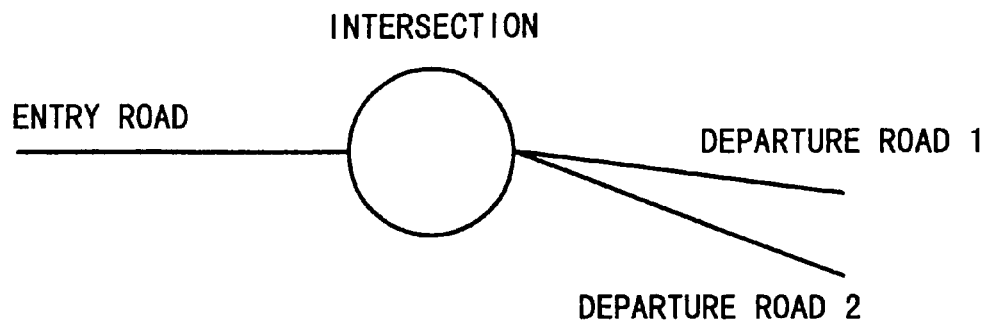
FIG. 9 is an explanatory diagram illustrating acquisition of road data for an intersection.

The present invention provides guidance at a guide branch point, by voice, in the aforementioned Step S4. For voice guidance at an intersection, a conventional approach is to compute an angular relationship between a road on the guidance route (route determined by search) identified as entering the intersection, and a road on the guidance route departing the same intersection, and the content of the voice guidance is determined on the basis of the computed angle. However, in this conventional method, when the angles of roads 1 and 2 departing the intersection have no substantial difference, as shown in FIG. 9, the guidance "right" is output for both the roads 1 and 2, and such guidance does not differentiate between the two roads, making compliance difficult. In order to overcome this problem associated with an intersection as shown in FIG. 9, the present invention acquires information for all the roads departing the intersection in order to differentiate between roads 1 and 2 in providing voice guidance.

First of all, the method of acquiring the information for all roads departing the intersection will be described for the case of no intersection link with reference to FIG. 9. Here, symbol o indicates a node (or intersection), and a thick line indicates the route.

Figure 10:
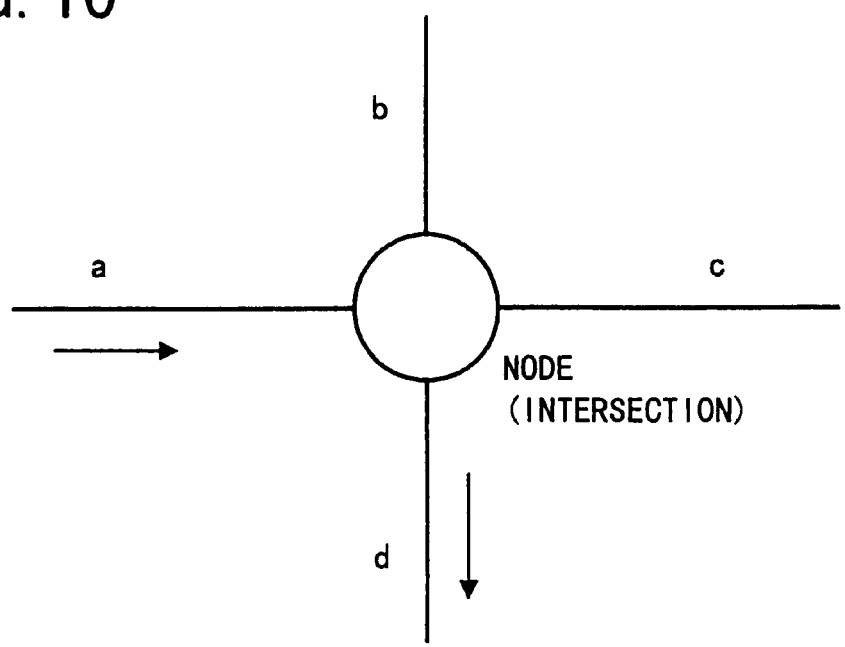
FIG. 10 is an explanatory diagram illustration acquisition of road data for an intersection having no intersection link.

In FIG. 10, it is assumed that roads a, b, c and d are for the facing traffic, and that the route is from a to b. Then, at the intersection of FIG. 9, the entry road is designated a, whereas the departing roads are designated b, c and d.

Figure 11A:
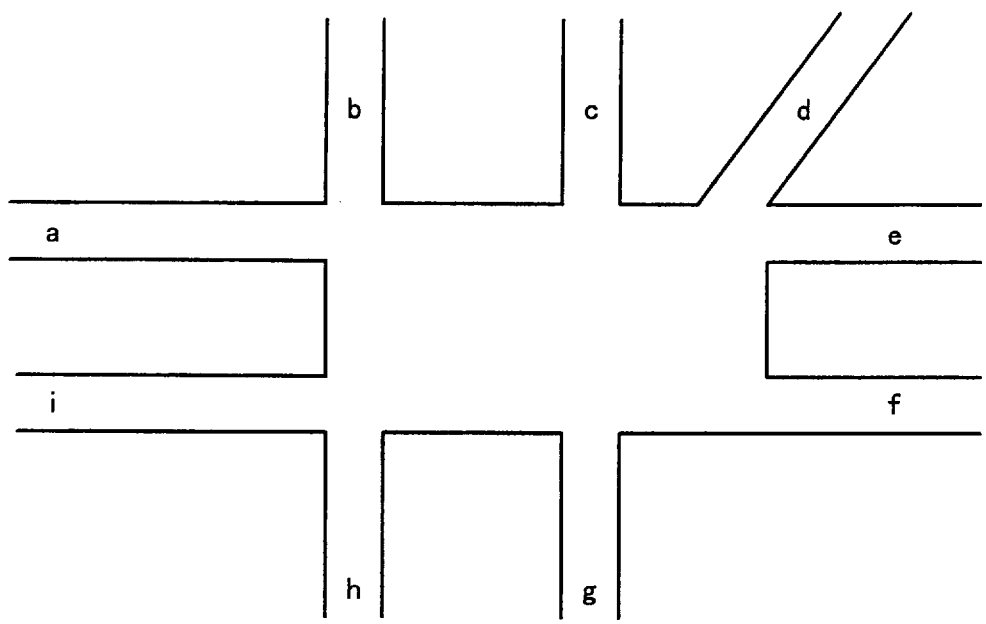
FIGS. 11A and 11B are explanatory diagrams for road data acquisition at an intersection having an intersection link.

Here will be described road data acquisition in the case of an intersection link as shown in FIG. 11A. The roads having an intersection link structure or "attribute", as such terminology is used herein, are the "imaginary roads" represented by dashed lines in FIG. 11B and so that a geographic point (as contrasted with an area) for the intersection may be represented by data. The intersection in FIG. 11A, is represented by a plot diagram in FIG. 11B. Here, symbols o indicate nodes (1 to 5), and letters j to n indicate roads having an intersection link structure or attribute. It is assumed that roads a and i are separate one-way lanes, and that the guidance route is a-j-l-g.

The conditions for the road data acquisition at this intersection are as follows:

(1) Of the roads departing the intersection, the road segments within the continuous intersection link are not treated as roads departing the intersection but, rather, are skipped in the acquisition of road data, whereas the roads extending outside of the intersection link are treated as roads departing the intersection; and (2) The roads neither lying on the route nor having the attributes of the intersection link are treated as roads departing the intersection.

Figure 11B:
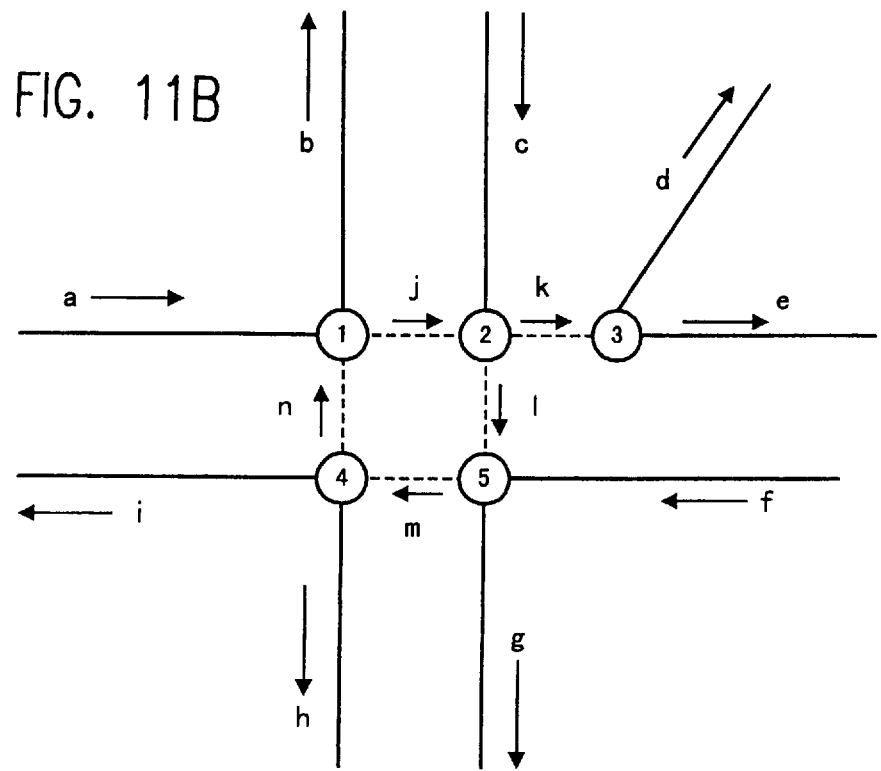

In the example of FIGS. 11A and 11B, the roads departing the node 1 are designated b and j. Road b is selected as the departing road because it has no intersection link attribute. On the other hand, the road j is skipped over in data acquisition because it has an intersection link structure (attribute), so that the roads k and 1 departing the node 2 are next examined. The road k is skipped because it has the intersection link attribute, so that the roads d and e departing the node 3 become the subject of road data acquisition. The roads d and e are treated as departing roads because they do not have the intersection link attribute. On the other hand, the road 1 is skipped because it has the intersection link attribute (link internal to the intersection), so that the roads m and g departing the node 6 are treated as departing roads. The road g is also treated as a departing road because it is on the guidance route but has no intersection link attribute. On the other hand, the road m is skipped because it is a road departing the guidance route and has the intersection link attribute, so that the roads i and n departing the node 4 are examined. The road i is treated as the departing road because it has no intersection link attribute. However, the road n is skipped over because it has the intersection link attribute, but the roads b and j are not treated as departing roads because they have already been treated. Hence, at the intersection depicted in FIGS. 11A and 11B, the roads b, d, e, g and i are designated as departing roads.

The case of travel from the road h to the road d, with reference to the intersection shown in FIGS. 11A and 11B, will now be described. Since the nodes 1 and 3 are present on the route in accordance with the method of the prior art, the prior art guidance at this intersection would be "right" at node 1 and "oblique left" at node 3. Such guidance messages are defective in that they are complex and difficult to understand. In the present invention, in contrast, the roads i and b are treated as roads departing the intersection with respect to the road h, but the road segments n and j are treated as being internal to the intersection link, i.e. as having a "link attribute". In the route from the road h to the road d, the node 1 is within the intersection link, and is skipped. Next, the roads k and 1 are examined and skipped because they are internal to the intersection link, i.e. they each have an intersection link attribute. Then, the next roads d and e are treated as departing this intersection. In the route to the road d from the road h, therefore, the route guidance at this guide intersection becomes a single message with instructions which can be performed by one action. That is, the guidance "oblique right" provides all the instruction necessary for turning from road h onto road d so that the guidance route can be reliably followed in accordance with the guidance message issued in advance of this guide intersection being entered.

Figure 12:
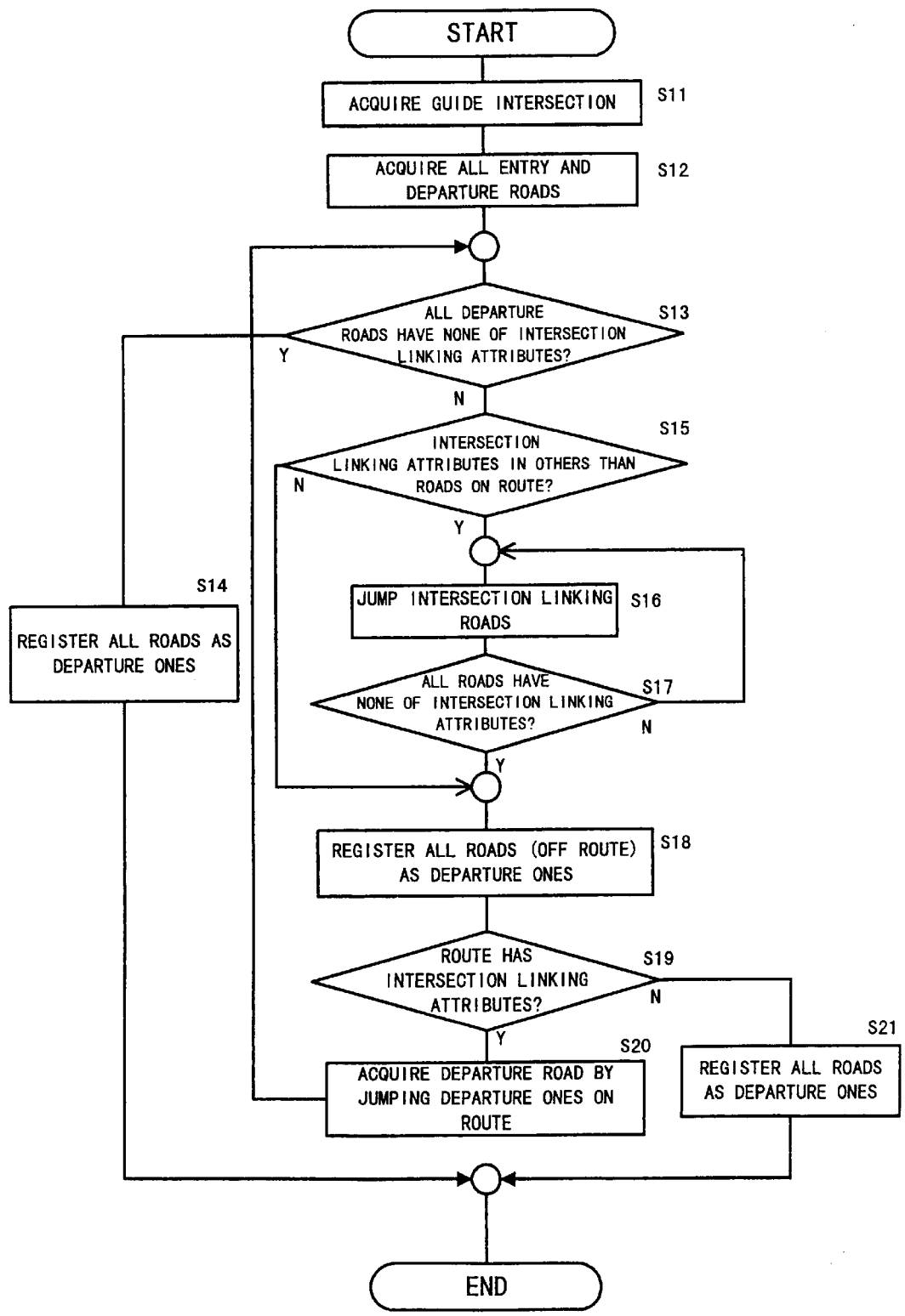
FIG. 12 is a flow chart of a routine for acquiring data for all roads departing an intersection.

In the routine illustrated in FIG. 12, from the route information acquired by the route search, a next guide intersection is determined (at Step S11). An admission road (or entry road) to the guide intersection is determined, and all the roads (or departing roads) leading from the admission road to the next guidance intersection are acquired (at Step S12) from the road information. For all the departing roads acquired, it is then decided (at Step S13) whether or not the individual roads have the intersection link attributes. Here, if it is decided that none of the departing roads have the link attribute, all the roads at this time are registered as roads departing the guidance intersection (at Step S14). On the contrary, if all the roads are decided to have the link attribute, it is decided (at Step S15) whether or not a road having the link attribute is not one of the departing roads on the present guidance route. If a road having the link attribute is outside of the route, the routine skips it to roads connected thereto (at Step S16). It is further decided (at Step S17) whether or not the road to which the routine jumps has the link attribute. If it is a road having the link attribute, the routine returns to before Step S16, and these actions are repeated until the routine reads a road not having the linking attribute. If it is decided by these repeated steps that no road has the linking attribute, all the acquired roads are registered as those departing that guide intersection (at Step S18). Next, the link attributes of the roads on the route are decided (at Step S19). If a road having the linking attribute remains on the route, the departing road on the route is skipped, the next departing road is acquired and the routine returns to before Step S13 (at Step S20). As a result, the routine is repeated until the departing road on the guidance route is identified as one exiting the intersection. If it is decided at Step S19 that no road on the guidance route has the linking attribute, all the acquired roads are registered as the roads departing that guidance intersection (at Step S21).

While the invention has been described with reference to preferred embodiments, the foregoing embodiments are merely illustrative of the invention and should not be construed as limiting the invention. Various modifications and applications may be adopted by those skilled in the art without departing from the true spirit and scope of the invention as defined by the appended claims.

What is claimed is:

1. A vehicular navigation system comprising:

present position detecting means for detecting the present position of a vehicle;

input means for inputting information necessary for a route search;

guidance information storage means containing stored road information including intersection data and link data;

route search means for searching the road information to determine a guidance route on the basis of the information input by said input means;

output means for outputting guidance information for the guidance route;

route information storage means for storing the information for the guidance route determined by said route search means; and guide control means for outputting guidance information for a next intersection to said output means on the basis of the guidance route and the present position detected by said present position detecting means, wherein said guide control means acquires the guidance information for the next intersection from said route information storage means and information for link data of the next intersection from the road information of said guidance information storage means, and determines a guidance instruction for the next intersection on the basis of a road identified as an admission road to the next intersection and the link data of the next intersection.

2. A vehicular navigation system comprising:

present position detecting means for detecting the present position of a vehicle;

input means for inputting information necessary for a route search;

guidance information storage means containing stored road information including intersection data and link data;

route search means for searching the road information to determine a guidance route on the basis of the information input by said input means;

output means for outputting guidance information for the guidance route;

route information storage means for storing the information for the guidance route determined by said route search means; and guide control means for outputting guidance information for a next intersection to said output means on the basis of the guidance route and the present position detected by said present position detecting means, wherein said guide control means acquires the guidance information for the next intersection from said route information storage means and information for a road joining the next intersection from the road information of said guidance information storage means, determines a guidance instruction for the next intersection on the basis of a road identified as an admission road to the next intersection and the link data of said road information, and skips a road having a link attribute in the determination of the guidance instruction.

3. A vehicular navigation system comprising:

present position detecting means for detecting the present position of a vehicle;

input means for inputting information necessary for a route search;

guidance information storage means containing stored road information including intersection data and link data;

route search means for searching the road information to determine a guidance route on the basis of the information input by said input means;

output means for outputting guidance information for the guidance route;

route information storage means for storing the information for the guidance route determined by said route search means; and guide control means for outputting guidance information for a next intersection to said output means on the basis of the guidance route and the present position detected by said present position detecting means, wherein said guide control means acquires the guidance information for the next intersection from said route information storage means and information for a road joining the next intersection from the road information of said guidance information storage means, determines a guidance instruction for the next intersection on the basis of a road identified as an admission road to the next intersection and the link data of said road information, and registers a road having no link attribute as a road departing the next intersection.

4. A storage medium having programs packaged therein for searching for a route to a destination from a starting place or a present location and for providing guidance along the searched route, said programs comprising routines for:

identifying a next guide intersection on the searched route;

acquiring data for all roads departing the identified next guide intersection, said data including link data for each departing road characterizing each departing road as either having an intersection link attribute or not having an intersection link attribute;

registering one of the roads as departing the guide intersection point on condition that the road has no intersection link attribute; and determining a guidance instruction for the next guide intersection based on the one registered road.

5. A storage medium according to claim 4, wherein said routines, in determining the guidance instruction, skip any road among the acquired roads which is characterized as having the intersection link attribute.

6. A vehicular navigation system comprising:

present position detecting means for detecting the present position of a vehicle;

input means for inputting information necessary for a route search;

guidance information storage means containing road information stored therein, said road information including intersection data describing guide intersections, road data describing road segments and link data indicating whether or not a road segment is internal to an intersection;

route search means for determining a guidance route on the basis of the information input by said input means;

route information storage means for storing the information on the guidance route determined by said route search means; and guide control means for selectively retrieving information for a next intersection on the guidance route from said route information storage means, for identifying an admission road segment by which the guidance route enters the next guide intersection, for retrieving road information on another road segment joining the next guide intersection from the road data stored in the information storage means, for examining the link data for the another road segment, for identifying a road segment departing the next guide intersection as suitable for guidance based on said examination of the link data, and for determining a guidance instruction for the next guide intersection based on the identified admission road segment and the identified departing road segment; and output means for outputting guidance information for the guidance route selectively retrieved from said guidance information storage means.

7. A vehicular navigation system according to claim 6, wherein a road segment identified by the link data as being internal to an intersection is treated by said guide as ineligible for identification as the departing road segment.

8. A vehicular navigation system according to claim 6, wherein each road segment is characterized by the link data as either having or not having a link attribute indicative of a road segment internal to an intersection, wherein road segments characterized as having the link attribute are treated by said guide control means as ineligible for identification as the departing road segment and wherein said guide control means registers a road segment not having the link attribute as the identified departing road segment.

\* \* \* \* \*